Figure 1:
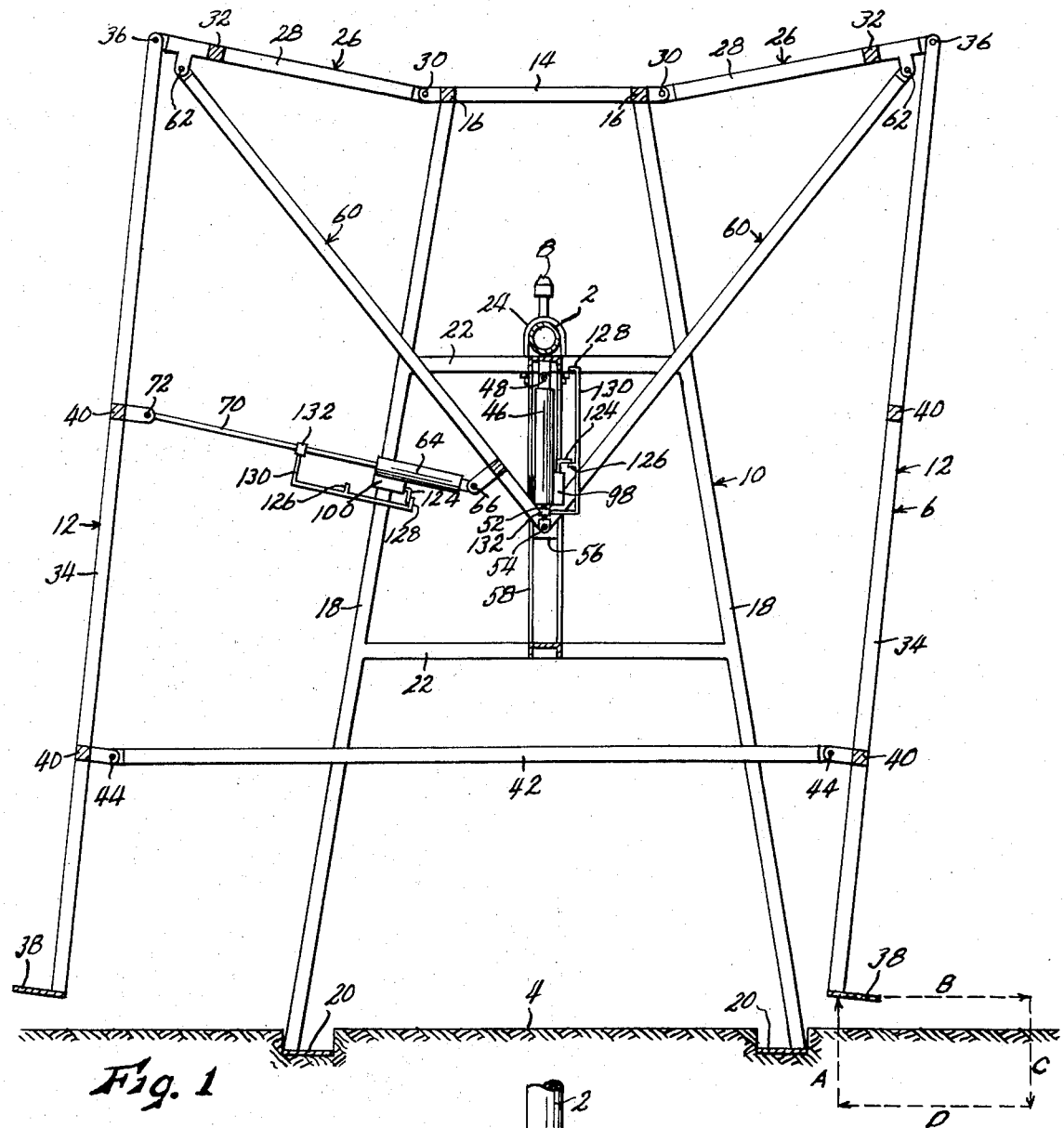

United States Patent [19]
Paul

[11] 3,856,038
[45] Dec. 24, 1974

[54] IRRIGATION PIPE WALKER
[76] Inventor: George T. Paul, 2521 Wisconsin, Joplin, Mo. 64801
[22] Filed: Nov. 5, 1973
[21] Appl. No.: 412,882

[52] U.S. Cl. .............................................. 137/344
[51] Int. Cl. .......................... A01g 25/02, B05b 3/12
[58] Field of Search ............. 137/344; 239/212, 213

[56] References Cited
UNITED STATES PATENTS
3,302,883  2/1967  Stout............................. 137/344 X

*Primary Examiner*—Henry T. Klinksiek
*Attorney, Agent, or Firm*—John A. Hamilton

[57] ABSTRACT

An irrigation pipe walker consisting of one of a series of towers spaced along and adapted to support an irrigation pipe above ground level for movement transversely of itself, the tower including a rigid frame to which the pipe is affixed and having ground engaging feet, movable feet also carried by the frame, and power operating means for moving said movable feet vertically to levels respectively above and below the frame feet, and horizontally in respectively opposite directions, the horizontal and vertical movements being alternated whereby the tower is caused to walk along the ground in a direction transverse to the pipe.

10 Claims, 7 Drawing Figures

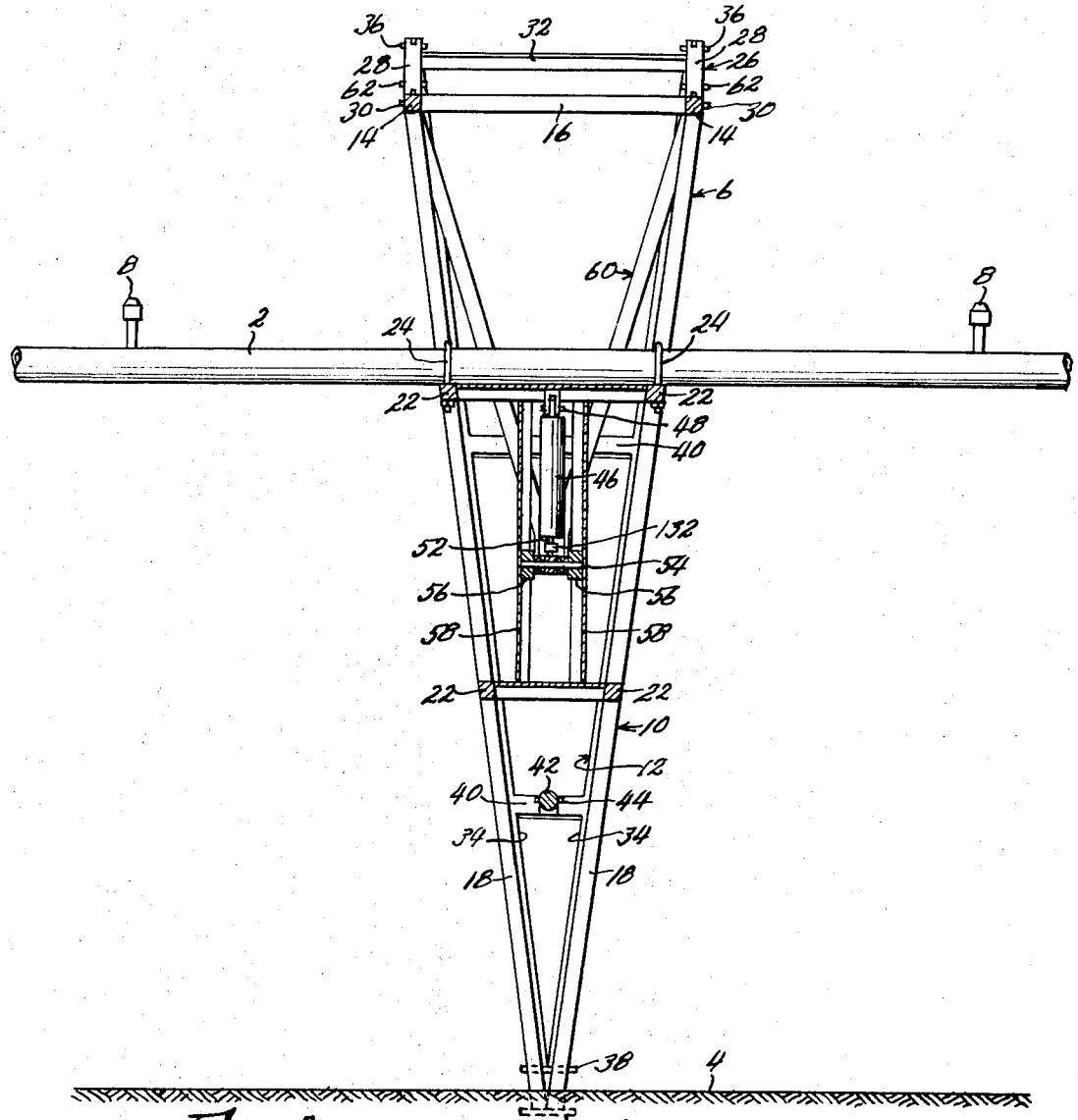
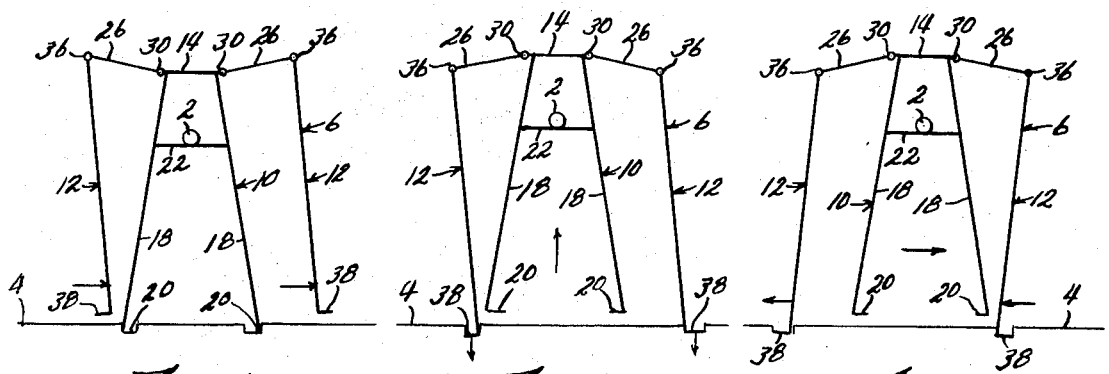

IRRIGATION PIPE WALKER

This invention relates to new and useful improvements in irrigation equipment, and has particular reference to a type of irrigation equipment commonly used in agricultural areas for irrigation of large fields. In this type of equipment a long pipe, up to perhaps one-quarter mile in length, is extended horizontally above the ground, and is supported at intervals of perhaps 50 to 100 feet along its length by ground engaging towers. It is normally supported at one end by a special tower for rotation on a vertical axis, and water supplied thereto at this point, to be distributed over the ground by spray heads distributed along its length. Mechanism is provided for causing the towers to move over the ground transversely of the pipe, so that the free end of the pipe moves in a large circle with the pipe as a radius, and water is thereby distributed over a very large ground area.

However, difficulty has been commonly experienced in providing for travel of the individual towers over the ground. In all prior apparatus within my knowledge, each tower has been supported either by ground engaging wheels, driven by suitable motors or engines, or by ground-engaging skids, which are moved along the ground in the manner of sled runners by some type of power driven "pusher" mechanism. Both of these types of propulsion means have been found to require inordinate amounts of power for their operation, due to the fact that the irrigation water being applied to the ground by the equipment renders it soft and muddy, so that the wheels or skids often become mired to a considerable depth. This greatly increases the power required for propulsion, since the mud resists turning of the wheels or movement of the skids, the wheels or skids in effect being required to move uphill even on level ground, or at least to require the same amount of power as though they were in fact moving uphill.

Accordingly, the principal object of the present invention is the provision of a tower for supporting the irrigation pipe as described which may be operated with a minimum power requirement even on ground which is quite muddy, the power required not being materially increased by softness of the ground. Generally, this object is accomplished by providing a mechanism by which the tower is caused to "walk" over the ground, being supported by ground engaging feet which move vertically and horizontally in a proper sequence to provide such walking action. The feet engage and disengage the ground with substantially vertical movement only. Thus they may sink into the ground to whatever depth may result from the softness of the ground, without materially increasing the operating power required. There is substantially no horizontal movement of the feet relative to the ground at any time they are in engagement with the ground.

Another object is the provision of an irrigation pipe tower of the character described including a main frame having ground engaging feet and to which the irrigation pipe is affixed, horizontally and vertically movable feet also carried by the frame, and power means operable to move said movable feet alternately upwardly and downwardly to levels respectively above and below the horizontal level of the frame feet, and alternately in opposite directions in a horizontal direction transverse to the pipe, said vertical and horizontal movements being alternated to impart the desired walking action to the tower.

A further object is the provision of an irrigation pipe walking tower in which the direction and sequence of the horizontal and vertical movements of the movable feet may be reversed, whereby to reverse the direction of walking movement of the tower.

A still further object is the provision of a tower of the character described which may be powered by water flowing under pressure in the irrigation pipe itself.

Other objects are simplicity and economy of construction, and efficiency and dependability of operation.

Figure 2:
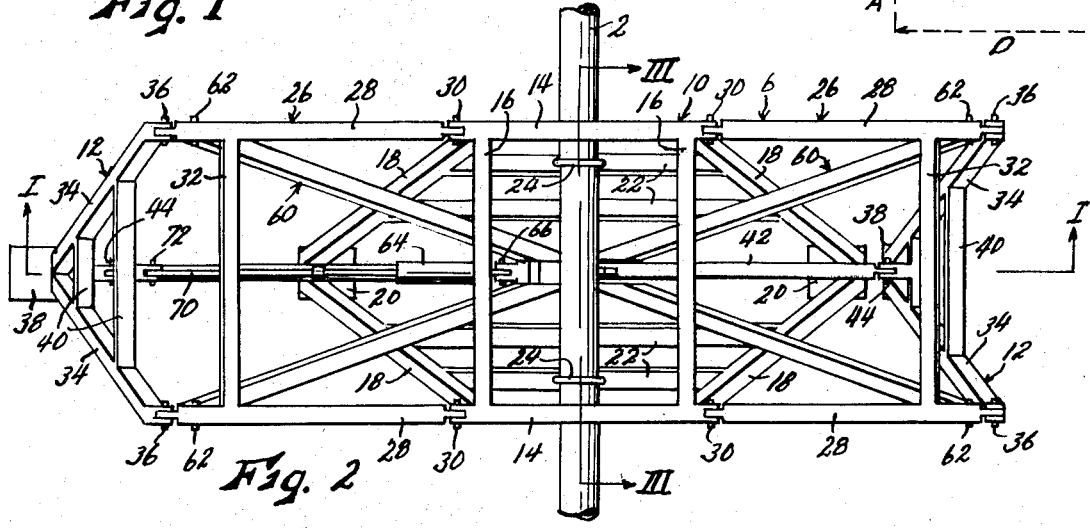
Figure 7:
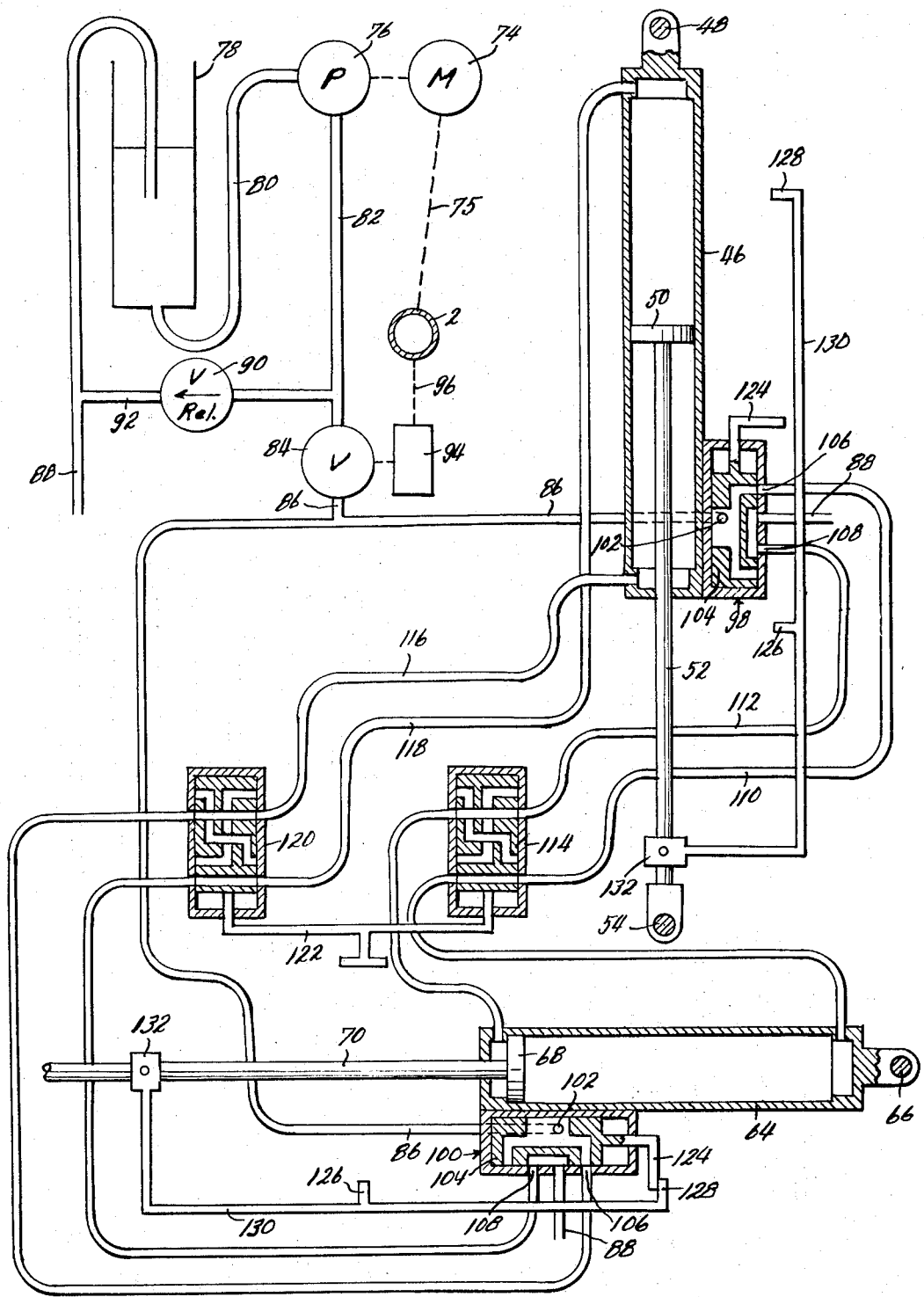

With these objects in view, as well as other objects which will appear in the course of the specification, reference will be had to the accompanying drawing, wherein:

FIG. 1 is a vertical sectional view of a walking support tower for irrigation pipes embodying the present invention, being taken on line I—I of FIG. 2, with parts left in elevation, FIG. 2 is a top plan view of the tower as shown in FIG. 1, FIG. 3 is a sectional view taken on line III—III of FIG. 2, with parts left in elevation, FIGS. 4, 5, and 6 are line diagrams similar to FIG. 1, but showing the tower at successive steps of the walking action thereof, and FIG. 7 is a schematic diagram of the control system of the device.

Like reference numerals apply to similar parts throughout the several views, and the numeral 2 applies to an irrigation pipe. In use it extends horizontally in spaced apart relation above the ground level 4, usually about ten feet thereabove. It is supported at one end for rotation about a vertical axis by an anchor tower, not shown, and is supported at intervals of perhaps 50-100 feet along its length by a series of ground engaging towers, only one of which is shown, designated generally by the numeral 6, although all others may be identical. Water under pressure is supplied to the pipe at the pivoted end thereof, and it is capped at its free end. The water is discharged from the pipe through a series of spray heads or nozzles 8 interconnected therein at intervals therealong.

In order for the pipe to be rotated about its pivoted end, whereby the irrigated area will be circular with pipe 2 as its radius, all of the towers 6 must travel over the ground in a direction transverse to the pipe, and it is in the mechanism for producing this travel of each tower that the present invention resides.

Accordingly, each tower 6 will be seen to include a main frame 10 and a pair of outrigger legs 12. Main frame 10 includes a horizontal rectangular top frame including parallel front and rear bars 14 and cross bars 16, rigidly joined together, and four legs 18 affixed to and depending from the corners of said top frame. The legs at the opposite sides of the frame are downwardly divergent, and the legs at each side of the frame are downwardly convergent, coming together and being fixed at their lower ends to a horizontal planar foot member 20 which at times engage the ground. The feet are of sufficient area to avoid undue indentation thereof into the soft ground under the full tower load, although some indentation, as shown, is virtually inescapable if the ground is soft. The legs 18 at the front of the frame, and those at the back, are connected by laterally extending cross bars 22, and pipe 2 extends through the top portion of the main frame, midway between feet 20, being affixed as by U-bolts 24 to corresponding top cross bars 22.

Pivoted to each side of the top of main frame 10 is a rectangular link frame 26, which extends laterally outwardly, and which consists of front and rear rails 28 each pivoted at its inner end, as at 30, to the adjacent end of the corresponding main frame bars 14, and rigidly interconnected by a cross bar 32. Link frames 26 may thus pivot vertically.

Each outrigger leg 12 comprises a pair of legs 34 each pivoted at its upper end, as at 36, to the outer end of one of rails 28, and converging downwardly and being fixed at their lower ends to a planar foot member 38, foot members 38 corresponding in area to foot members 20. The component legs 34 of each outrigger are connected at intervals in their height by cross bars 40. Thus the outrigger legs may pivot horizontally in a direction transverse to pipe 2, on pivots 36. They are maintained substantially parallel, and forced to move in unison, by a link 42 pivoted at its opposite ends, as at 44, to the lower cross bars 40 of the respective outrigger legs. Said link extends generally horizontally, through the lower portion of the main frame.

The outriggers are moved upwardly and downwardly by a doubleacting hydraulic cylinder 46 pivoted in main frame 10, as at 48, just beneath pipe 2, and having therein a piston 50 the downwardly extending piston rod 52 of which is pivoted on a pin 54 extending horizontally between and mounted at its respective ends in a pair of blocks 56 mounted for vertical sliding movement in guideways 58 fixed in the main frame. Pivoted on pin 54 are the lower ends of a pair of struts 60 which are upwardly divergent, each of said struts being pivoted at its upper end, as at 62, to the corresponding link frame 26, adjacent the outer end thereof. Therefore, by alternately extending and retracting piston rod 52, the outrigger legs are alternately lowered and raised. The outrigger legs are moved selectively to the right or left, as viewed in FIG. 1, by a generally horizontal double acting hydraulic cylinder 64 pivoted to one of struts 60, as at 66, adjacent its lower end, and carrying a piston 68 the outwardly extending piston rod 70 of which is pivoted, as at 72, to one of the cross bars 40 of the left outrigger leg.

Thus, it will be apparent that by operating the cylinders 46 and 64 in the proper sequence and directions, the feet 38 of the outrigger legs may be caused to move in a generally rectangular path, the path lying in a vertical plane transverse to pipe 2, as shown in the dotted line diagram at the lower right portion of FIG. 1, the four strokes thereof being labelled respectively A, B, C, and D. In stroke A feet 38 are in their leftmost position, and move upwardly from a level below the plane of frame feet 20 to a level thereabove. During this stroke frame feet 20, which were above the ground at the beginning of the stroke, are lowered to the ground to support the tower, and at the completion of this stroke the parts have the positions shown in FIG. 1. In stroke B, feet 38 move to the right, to the position shown in FIG. 4. In stroke C, feet 38 are lowered to support the tower and main frame 10 is elevated above the ground, the parts having the positions shown in FIG. 5 at the completion of this stroke. In stroke D, feet 38 are moved to the left relative to the main frame, but since they of course cannot move relative to the ground, main frame 10 moves to the right, carrying pipe 2 with it. It is of course only during stroke D that pipe 2 is moved horizontally relative to the ground, in this case to the right. By reversing the sequence and direction of the strokes just described, the tower and pipe may be caused to walk to the left.

The hydraulic cylinders are powered by a motor 74 which may be of any suitable type, for example a hydraulic motor powered by water under pressure diverted from pipe 2, as indicated at 75. Said motor drives a pump 76 which draws hydraulic fluid from a reservoir 78 through a conduit 80 and delivers it under pressure through a conduit 82 through an actuator valve 84 to a conduit 86 and to cylinders 46 and 64 as will be described. Fluid from the cylinders returns to reservoir 78 through a common return conduit 88. It will be understood that the described walking action of the tower continues as long as valve 84 is open. A pressure relief valve 90 is connected in a conduit 92 between conduits 82 and 88, to permit continuous operation of motor 74 and pump 76 when valve 84 is closed.

In the described irrigation system, wherein pipe 2 is pivoted on a vertical axis at one end and supported by a series of towers 6, one of the towers, usually the one furthest from the pivot, is designated as the pacer tower and walks continuously. That is, its actuator valve 84 is open at all times. The distance to be walked by each of the other towers is of course not uniform, but decreases with each closer tower to the pivot, since it transverses a circle of lesser diameter. Therefore, the actuator valve 84 of each closer tower to the pivot axis will necessarily be open for a smaller proportion of the total time. To keep the towers in synchronization, and therefore to maintain pipe 2 reasonably and acceptably straight at all times, the actuator valve 84 of each tower except the pacer tower is provided with a valve operator 94 operable to open and close said valve, said valve operator being controlled by an operative connection 96 thereof to pipe 2 so as to open the valve in response to some movement of the pipe resulting from unequal movement of adjacent towers. For example, operative connection 96 may be responsive to horizontal flexure of pipe 2 resulting from unequal movement of adjacent towers, so as to cause opening of valve 84 whenever said flexure exceeds a predetermined amount, say two degrees, and to cause closure of the valve when said flexure falls below that degree. However, the specific nature of this detection apparatus is not pertinent in itself to the present invention, and is therefore not shown here in detail. The pipe can easily flex to the degree required to actuate such a detection device, and also to permit one tower main frame to be elevated by extension of cylinder 46 when adjacent towers are not so elevated, due to the inherent flexibility of the pipe in the lengths thereof between towers. As a matter of fact, the pipe lengths between towers must usually be provided with reinforcement trusses to prevent undue sagging thereof.

Cylinder 46 has mounted externally thereon a control valve 98, and cylinder 64 has mounted thereon a main control valve 100. Each of said control valves has an inlet port 102 to which conduit 86 is connected, and contains a slide 104 movable reciprocally therein and each slide has passages therein operable when said slide is moved in one direction to connect inlet port 102 with one outlet port 106, and when moved in the opposite direction to connect inlet port 102 with a second outlet port 108, and in either position to connect the outlet port not connected to inlet port 102 to return conduit 88. Outlet ports 106 and 108 of valve 98 are connected respectively to the opposite ends of cylinder 64 by conduits 110 and 112, through a manually operable reversing valve 114, and outlet ports 106 and 108 of valve 100 are connected respectively to the opposite ends of cylinder 46 by conduits 116 and 118, through a manually operable reversing valve 120. Reversing valves 114 and 120 are provided with a mechanical interlock 122 which requires that they operate simultaneously.

Slides 104 of the control valves are mechanically movable, each being provided with a handle 124 extending outwardly from the valve and engageable by the fingers 124 and 128 of a control rod 130 extending parallel to the piston rod of the associated cylinder and affixed to said piston rod at 132. As each piston rod approaches its fully extended position, finger 128 engages handle 124 to position the associated valve to deliver fluid under pressure to its outlet port 106 and as the piston approaches its fully retracted position, finger 126 engages handle 124 to move it in an opposite direction to position the associated control valve to deliver fluid under pressure to its outlet port 108. It will be understood that there is sufficient frictional or other resistance to movement of valve slides 104 that they will be moved only by fingers 126 and 128.

Motor 74, pump 76, reservoir 78, and valves 84 and 90 may conveniently be mounted in the upper portion of main frame 10 of the tower, while reversing valves 114 and 120 are most conveniently mounted on one or the other of cylinders 46 and 64.

In describing the operation of the tower, principal reference will be had to FIG. 7. It will be understood that reversing valves 114 and 120 have been set to cause walking of the tower to the right as viewed in FIG. 1. They may both be reversed to cause walking to the left, by reversing mechanical interlock 122. FIG. 7 shows the hydraulic system at the midpoint of the previously defined stroke A, during which outrigger feet 38 are in their leftmost position and are moving upwardly. It will be seen that at this time piston 68 of cylinder 64 has been moved to its leftmost position by pressure in the right end of the cylinder, control valve 98 thereof having been set to deliver fluid to the right end of the cylinder by the preceding downward stroke of cylinder 46. At the same time, piston 50 of cylinder 46 is moving upwardly, control valve 100 of this cylinder having been set to deliver fluid to its lower end by the arrival of piston 68 at its leftmost position. This action continues, with outrigger feet 38 in their left position and rising, until piston 50 is fully raised, and the parts have the position shown in FIG. 1.

At this time, finger 126 of control rod 130 of valve 98 reverses the valve to deliver fluid to the left end of cylinder 64, causing outrigger feet 38 to move to the right, while piston 50 of cylinder 46 is maintained elevated by the previous setting of valve 100, this setting not being disturbed at this time. Outrigger feet 38 thus move through stroke B, to the right and above ground level, as shown in FIG. 4. At the completion of stroke B, valve 100 is reversed by its control rod 130 to deliver fluid to the top end of cylinder 46 to cause lowering of piston 50, while piston 68 is maintained to the right by the setting of valve 98, and outrigger feet 38 move through stroke C to the FIG. 5 position. At the completion of stroke C, valve 98 is set to cause movement of piston 68 to the left, while valve 100 maintains piston 50 in its lowered position, and feet 38 move through stroke D to their FIG. 6 position, where stroke A is initiated again as already described, and the cycle repeats so long as valve 84 is open. During stroke D, pipe 2 is moved to the right relative to the ground. The tower can be caused to walk to the left by reversing the setting of both of reversing valves 114 and 120. This reverses the order and direction of strokes A, B, C, and D.

The cycle may be terminated at any stage by closure of valve 84, and recommenced whenever said valve is again opened. Closure of this valve locks cylinders 46 and 64 hydraulically in position, so that pipe 2 cannot "drift" horizontally, when the tower is supported by the outrigger feet during stroke D, during which stroke closure of valve 84 will of course normally occur. Such lateral "drifting" of pipe 2 could cause an intermittent "hunting" action of the hydraulic system. Also, accidental missetting of valves 98 and 100 can have no serious consequences. For example, if slide 104 of valve 98 were accidentally raised during stroke A, its effect would merely be to cut off the upper left corner portion of the rectangular A-B-C-D diagram of FIG. 1 with a diagonal, and the system would be righted at the B-C corner of the diagram. The system will right itself, and follow its standard cycle, regardless of the relative positions of the cylinders and control valves at the time valve 84 is first opened.

Thus it will be apparent that a pipe walker having various advantages has been produced. Since the ground engaging feet of the tower move only substantially vertically as they engage and disengage the ground, the power requirements thereof are not materially increased when the ground is soft or muddy, as is inherently the case under irrigation sprays. Such power requirements are relatively much greater in pipe supports carried by wheels or skids. Also, the present tower is simple and economical, and may be driven by any available power, such as electric motors, gasoline engines, or even, as shown, by the energy of the water in pipe 2. Its walking direction may be reversed at will.

While I have shown and described a specific embodiment of my invention, it will be readily apparent that many minor changes of structure and operation could be made without departing from the spirit of the invention.

What I claim as new and desire to protect by Letters Patent is:

1. A tower for supporting an irrigation pipe extending horizontally above ground level, said pipe being adapted to be secured to said tower and said tower having two sets of ground engaging feet, the feet of one set being movable relative to the feet of the other set, both vertically so that either set may be disposed higher than the other, and also horizontally in a direction transverse to said irrigation pipe, and operating means carried by said tower and operable to move one of said sets of feet relatively to the other set in a cyclically repetitive series of strokes consisting successively of an upward stroke, a horizontal stroke in one direction, a downward stroke, and a horizontal stroke in a direction opposite to said first horizontal stroke, whereby said tower is caused to walk in a direction transverse to the irrigation pipe, and whereby all of said feet move essentially only in a vertical direction as they engage and disengage the ground.

2. A tower as recited claim 1 with the addition of means operable to reverse the order and direction of said cyclically repetitive strokes, whereby said tower may be caused selectively to walk in either of two opposite horizontal directions.

3. A tower as recited in claim 1 wherein said tower comprises:
   a. a main frame having one of said sets of feet affixed thereto,
   b. means for affixing said irrigation pipe to said main frame, the feet of said one set being at least two in number and disposed at respectively opposite sides of the vertical plane of said irrigation pipe when said pipe is so affixed, and
   c. supporting means carried movably by said main frame and carrying the other set of said feet, said other set of feet being at least two in number and spaced at respectively opposite sides of the vertical plane of said irrigation pipe in all operative positions thereof.

4. A tower as recited in claim 3 wherein said operating means is operable to move said other set of feet vertically between a position above the horizontal plane of said main frame feet and a position below said plane, and horizontally in relatively opposite directions between fixed limits.

5. A tower as recited in claim 3 wherein said supporting means for said other set of feet comprises:
   a. a pair of vertically pivotal links carried by said main frame and extending outwardly therefrom in opposite directions of said irrigation pipe,
   b. an outrigger leg pivoted to the outer end of each of said links and depending therefrom, one of said other set of feet being affixed to the lower end of each of said legs, and
   c. means connecting said legs whereby they are maintained essentially parallel at all times.

6. A tower as recited in claim 5 wherein said operating means comprises:
   a. a first power means operable to pivot said links relative to said main frame, whereby said outrigger feet are moved vertically,
   b. second power means operable to pivot said outrigger legs horizontally relative to said links, whereby said outrigger feet are moved horizontally, and
   c. control means interrelating the operation of said first and second power means to produce movement of said outrigger feet in a cyclically repetitive series of movements, first in an upward direction at one limit of their horizontal movement, second in a horizontal direction to the opposite limit of their horizontal movement, third downwardly at said opposite limit of horizontal movement, and fourth horizontally to said one limit of their horizontal movement.

7. A tower as recited in claim 1 wherein said operating means comprises:
   a. a first double acting hydraulic cylinder carried by said tower and operable on opposite strokes thereof to respectively raise and lower said one set of feet between fixed limits,
   b. a second double acting hydraulic cylinder carried by said tower and operable on opposite strokes thereof to move said one set of feet horizontally in respectively opposite directions between fixed limits,
   c. means for supplying hydraulic fluid under pressure to said cylinders, and
   d. control means operable to alternate strokes of each cylinder with strokes of the other.

8. A tower as recited in claim 7 wherein said control means comprises:
   a. a pair of control valves disposed respectively in the hydraulic supply lines of said first and second cylinders, each of said control valves being mechanically settable to deliver fluid respectively to either end of its associated cylinder, and
   b. mechanical means operable by each of said cylinders, as said cylinder reaches either limit of its travel, to reverse the setting of the control valve supplying fluid to the other of said cylinders.

9. A tower as recited in claim 8 with the addition of a reversing valve in the hydraulic lines between each of said control valves and its associated cylinder, each of said reversing valves being manually operable to reverse the hydraulic connections between the associated control valve and cylinder, whereby the sequential order and direction of the cylinder strokes is reversed.

10. A tower as recited in claim 9 with the addition of a mechanical interlock between said two reversing valves, whereby they are constrained to reverse in unison.

* * * * *